United States Patent
Holzinger et al.

(10) Patent No.: US 10,514,053 B2
(45) Date of Patent: Dec. 24, 2019

(54) FASTENING DEVICE FOR A SANDWICH COMPONENT

(71) Applicant: Bayerische Motoren Werke Aktiengesellschaft, Munich (DE)

(72) Inventors: Michael Holzinger, Eching (DE); Maik Hammer, Bruckberg (DE); Joachim Starke, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 15/415,915

(22) Filed: Jan. 26, 2017

(65) Prior Publication Data

US 2017/0130750 A1 May 11, 2017

Related U.S. Application Data

(63) Continuation of application No. PCT/EP2015/065652, filed on Jul. 9, 2015.

(30) Foreign Application Priority Data

Jul. 30, 2014 (DE) .................. 10 2014 214 903

(51) Int. Cl.
*F16B 5/01* (2006.01)
*F16B 13/10* (2006.01)

(52) U.S. Cl.
CPC ............ *F16B 5/01* (2013.01); *F16B 2013/10* (2013.01); *Y10T 403/4949* (2015.01)

(58) Field of Classification Search
CPC .. F16B 5/01; F16B 13/04; F16B 13/06; F16B 13/063; F16B 13/08; F16B 13/0816;
(Continued)

(56) References Cited

U.S. PATENT DOCUMENTS

| 3,455,201 A | 7/1969 | Ryder |
| 3,579,942 A * | 5/1971 | Cole .................. F16B 5/01 411/113 |

(Continued)

FOREIGN PATENT DOCUMENTS

| CN | 102072232 A | 5/2011 |
| CN | 102272464 A | 12/2011 |

(Continued)

OTHER PUBLICATIONS

German Search Report issued in counterpart German Application No. DE 10 2014 214 903.7 dated Feb. 16, 2017 with partial English translation (twelve (12) pages).

(Continued)

*Primary Examiner* — Josh Skroupa
(74) *Attorney, Agent, or Firm* — Crowell & Moring LLP

(57) ABSTRACT

A snap-together fastening device includes a holding element and an actuating element. The holding element has one or more fixing arms that are actuatable from a mounting position into a fixing position. The actuating element is pluggable into an opening of the holding element, and has a top end and a bottom end. The actuating element deflects, in its position in which it is plugged into the holding element, at least one fixing arm into a fixing position. In its position in which it is plugged into the holding element an outermost edge of the actuating element, that is in the region of the top end, contacts an inner surface of the at least one fixing arm.

14 Claims, 3 Drawing Sheets

(58) Field of Classification Search
CPC ... F16B 13/0833; F16B 13/0891; F16B 13/126; F16B 13/128; F16B 2013/108; F16B 2013/10; Y10T 403/3941; Y10T 403/4916; Y10T 403/4924; Y10T 403/4949; Y10T 403/7039; Y10T 403/7058; Y10T 403/75
USPC .... 403/193, 276, 277, 280, 361, 371, 408.1; 411/32, 33
See application file for complete search history.

(56) References Cited

U.S. PATENT DOCUMENTS

| | | | | |
|---|---|---|---|---|
| 4,428,705 A * | 1/1984 | Gelhard | ............... | F16B 37/122 29/460 |
| 5,106,225 A * | 4/1992 | Andre | ............... | F16B 5/0233 403/408.1 |
| 6,874,983 B2 * | 4/2005 | Moerke | ............... | F16B 19/1081 24/297 |
| 8,387,340 B2 * | 3/2013 | Zimmer | ............... | F16B 13/144 411/32 |
| 8,393,124 B2 * | 3/2013 | Zimmer | ............... | F16B 13/063 411/34 |
| 8,511,035 B2 * | 8/2013 | Zimmer | ............... | F16B 13/144 411/32 |
| 8,857,132 B2 * | 10/2014 | Zimmer | ............... | F16B 13/126 411/57.1 |
| 2004/0208721 A1 * | 10/2004 | Kuenzel | ............... | F16B 13/0833 411/340 |
| 2005/0249549 A1 | 11/2005 | Miyahara et al. | | |
| 2009/0272065 A1 | 11/2009 | Zimmer et al. | | |
| 2009/0290932 A1 | 11/2009 | Silbereisen et al. | | |

FOREIGN PATENT DOCUMENTS

| | | | |
|---|---|---|---|
| DE | 10 2006 020 697 B3 | 4/2007 | |
| DE | 10 2006 049 953 A1 | 4/2008 | |
| DE | 20 2009 000 017 U1 | 6/2010 | |
| DE | 10 2011 002 031 A1 | 10/2012 | |
| JP | 2005-321025 A | 11/2005 | |
| WO | WO 2009141064 A1 * | 11/2009 | ............... F16B 13/04 |
| WO | WO 2010/121830 A3 | 10/2010 | |
| WO | WO 2012/039058 A1 | 3/2012 | |

OTHER PUBLICATIONS

International Search Report (PCT/ISA/210) issued in PCT Application No. PCT/EP2015/065652 dated Sep. 14, 2015 with English translation (Four (4) pages).
German-language Written Opinion (PCT/ISA/237) issued in PCT Application No. PCT/EP2015/065652 dated Sep. 14, 2015 (Six (6) pages).
Chinese-language Office Action issued in counterpart Chinese Patent Application No. 201580019704.6 dated Jan. 22, 2018 with English translation (18 pages).
German-language European Office Action issued in counterpart European Application No. 15738298.7 dated May 24, 2019 (five (5) pages).

* cited by examiner

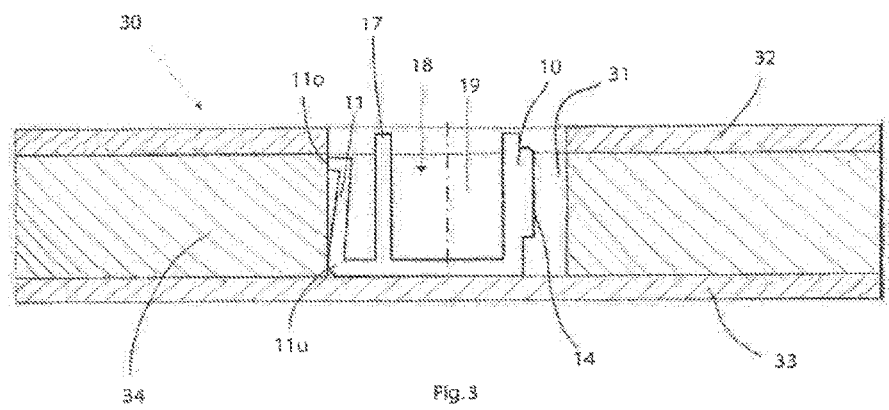
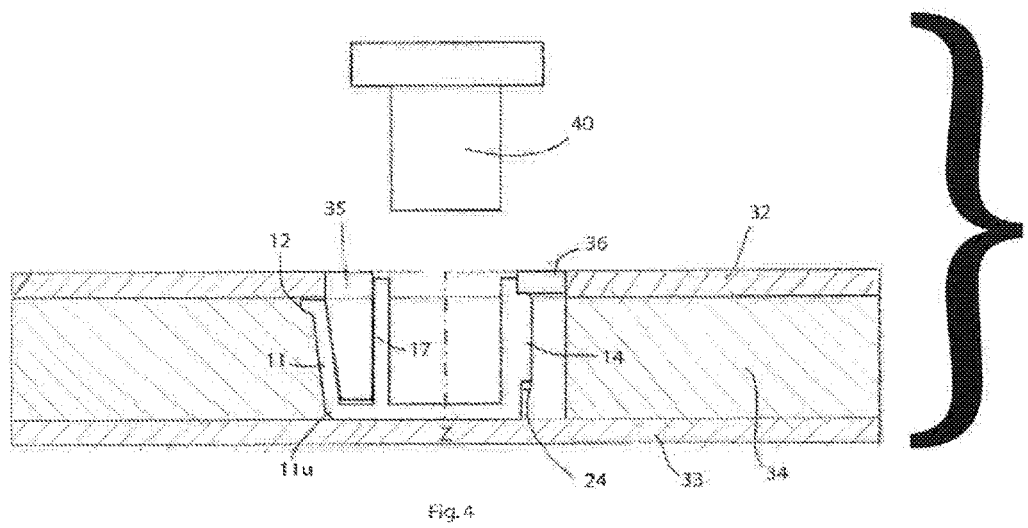

FASTENING DEVICE FOR A SANDWICH COMPONENT

CROSS REFERENCE TO RELATED APPLICATIONS

This application is a continuation of PCT International Application No. PCT/EP2015/065652, filed Jul. 9, 2015, which claims priority under 35 U.S.C. § 119 from German Patent Application No. 10 2014 214 903.7, filed Jul. 30, 2014, the entire disclosures of which are herein expressly incorporated by reference.

BACKGROUND AND SUMMARY OF THE INVENTION

The invention relates to a fastening device and to a method for producing an integrated fastening structure on or in a sandwich component with a fastening device of this type. In the context of the present invention, sandwich components are multiple-layer components with at least one "soft" core layer and an upper and lower cover layer with higher strength than the core layer, preferably produced from a fiber reinforced material.

The invention relates, in particular, to a snap-together fastening device for plug-in mounting into an opening of a sandwich component, such as a carbon fiber reinforced plastic sandwich component. The snap together fastening device includes two snap-together elements. Fixing arms, which can be actuated from a mounting position into a fixing position, are arranged on one element, which fixing arms penetrate mechanically into the core of the sandwich component. The result is that a non-positive connection to the sandwich component is produced.

Sandwich components, such as carbon fiber reinforced plastic sandwich panels, are increasingly used in the preparation of constructions or in automotive engineering and the like. A maximum of flexural stiffness with simultaneous weight saving can be achieved by way of sandwich panels. As a result of their design, firstly a great stiffness can be achieved with secondly a comparatively low weight. Sandwich panels are available in a very wide range of design variants. As a rule, sandwich panels consist of two cover layers which lie on the outside and a core which lies in between. Thus, for example, a carbon fiber epoxy sandwich panel consists of two cover layers made from carbon fiber fabric with an epoxy resin and a core made from PVC rigid foam.

There is fundamentally a requirement to connect sandwich components to one another or to other components or to fasten parts and elements thereto. The introduction of force for producing connecting points causes a large problem in practice, however. Unlike in the case of solid components and panels, such as plastic panels and metal panels, on which threads can be formed easily, this is not possible in the case of a foamed sandwich panel owing to the foam core.

Two conventional methods for producing connecting points on sandwich panels are known in the prior art. One method relates to injection molding or foaming encapsulation of the connecting elements with the core layer material, for example a foam of the sandwich panel (in-molding method). Here, for example, metallic threaded inserts are already integrated into the sandwich component during the production process. To this end, however, the required inserts, such as the abovementioned threaded inserts, have to be inserted between the cover layers (carbon fiber reinforced plastic panels) manually or by means of industrial handling technology and subsequently have to be encapsulated by the foam material. The integrally joined connection which is produced in this way can subsequently be loaded mechanically.

Among other issues, the circumstance here is disadvantageous in that the position of the connecting points has to already be fixed during the production. Furthermore, shape and positional tolerances and the associated tolerance compensation provide further problems. If further or other comparable fastening points are required later, they can no longer be added. Furthermore, the connection between the inserts and the sandwich component takes place via an integrally joined connection to the foam during curing of the foam, as a result of which a simple replacement or repair is also not possible.

Furthermore, profiled strips and connecting strips are known from the prior art which are typically fastened to the outer side of the sandwich components by means of screws which penetrate the panels. Document WO 002010121830A3 is mentioned by way of example in this regard. This document discloses an elongate fastening element having a U-shaped strip piece, a profiled strip which is divided into two part elements, and a connecting device which makes it possible to fasten modules utilizing a clamping mechanism. A special solution of this type is unsuitable, however, for equipping sandwich panels with connecting possibilities.

A further type of production of connecting points which is known in the prior art is the application of what are known as "onserts" to the sandwich panels. "Onserts" are connecting elements which are designed specifically for adhesive bonding with an, as a rule, plate-like base part. Onserts exist in different configurations. It is advantageous in this method that weakening of the sandwich components can be avoided owing to a lack of machining such as drilling, riveting or the like. Secondly, the connections have the disadvantages which are typical for adhesively bonded connections, such as the lack of temperature resistance and strength fatigue which is dependent on the former. In the case of transverse loads, adhesively bonded connections tend toward what is known as peeling off, which is likewise disadvantageous and is associated with weakening of the strength of the connection. Furthermore, the adhesive bonding process is complicated and requires defined process and curing times before further machining can take place.

During the production of lightweight structures, it is also disadvantageous at various positions if components such as onserts project from the sandwich composite structure with threaded pins or threaded bushes.

It is therefore an object of the present invention to provide a connecting arrangement for a sandwich component, which connecting arrangement overcomes the abovementioned disadvantages. Furthermore, the arrangement should be capable of being used more universally and should produce a satisfactory mechanical connection to the sandwich component without adhesive. Furthermore, it is an object of the present invention to propose a method for producing a fastening possibility, as to how an arrangement of this type can be integrated onto or into the composite component in a simple and inexpensive way.

This object is achieved by way of a connecting arrangement and a method for producing a fastening structure in accordance with embodiment of the invention.

According to the invention, a clamping arrangement is provided having two interacting elements, in which the first element (holding element) is inserted into the sandwich component and the holding element is transferred into a "clamping" state with the sandwich component by way of actuation of a second element (fastening element). The free ends of fixing arms of the holding element which are provided for the clamping action are pressed against the core layer of the sandwich component under tensile loading, whereby tensile forces which occur as a result of a positively locking connection are conducted via the upper cover layer into the shaped part. In the context of the present invention, "clamping" is to be understood to mean a state, in which a defined section of the first component is pressed onto or partially into the core material in a non-positive and/or positively locking manner. Any suitable structure or any suitable material can be used as the core material, such as a foam, a metal foam on the basis of textile nonwovens, extrudable materials, multi-skin sheets, rib structures, honeycomb structures and the like. The penetration or insertion into the zone between the cover layers (i.e., the core zone) can be realized, for example, by way of a hook, a projection or a rib on the fastening element, which, in the clamping position, are pressed into the core material, for example the foam, or simply into the cavity in the region of the core zone. According to the invention, the holding element is equipped to this end with at least one fixing arm which can be actuated from a mounting position into a fixing position. The fixing arm can be actuated from its rest position (mounting position) into its engagement position with the core (fixing position) by way of pushing of the actuating element into the holding element.

A further aspect of the present invention relates to the geometric adaptation of the elements to one another. In a favorable case, the upper end of the fixing arm which is active for the non-positive connection is to be at a spacing of "zero" with respect to the upper cover layer and is therefore to bear against the cover layer with contact, with the result that, in the case of tensile loading, the tensile forces are introduced directly via the upper cover layer into the shaped part. At any rate, the spacing between the active end of the fixing arm and the upper cover layer is to be selected to be suitably small, with the result that other dimensions which are to be maintained in the interaction of the holding element and the actuating element do not become greater, whereby a stable firm fit can be achieved overall.

In the most general embodiment of the invention, a snap-together two-piece fastening device is provided for plug-in mounting into an opening of a sandwich component. The fastening device consists of a holding element with one or more fixing arms which can be actuated from a mounting position into a fixing position and an actuating element which can be plugged into an opening of the holding element. The actuating element deflects, in its position in which it is plugged into the holding element, at least one fixing arm into its fixing position. In the context of the present invention, two-piece device does not necessarily mean a complete separation of the two elements, but rather a functional separation. One part (holding element) serves for the holding function and the other part (actuating element) serves for transferring the first part from a mounting position into a holding position.

In one advantageous embodiment of the invention, the two snap-together elements (holding element and actuating element) have a substantially cylindrical (pot-like) or rectangular enveloping shape, it also being possible for a cylindrical shape with an elliptical base area to be used.

According to the invention, a fastening device is provided, furthermore, in which a plurality of actuable fixing arms are arranged on the preferably cylindrical holding element in a radially circumferential manner. In the context of the present invention, "actuable" is understood to mean a preferably elastic movement of the fixing arm from a mounting position into a fixing position, the movement from the mounting position into the fixing position taking place by way of active deflection by way of the actuating element.

In a further preferred embodiment of the invention, on their side which is directed from the center of the fastening device substantially toward the outside, the fixing arm or arms have engagement elements which are configured for mechanical penetration into a sandwich element when the fixing arms are actuated by the actuating element into their fixing position. In this position, the engagement elements of the fixing arms grip into the foam, with the result that the fastening device experiences a firm fit in the composite component.

A further aspect of the present invention relates to the configuration of the holding element. Since the aim of the present invention is the provision of a suitable fastening possibility on a composite component, the holding element is provided with a desired coupling form, such as an internal thread, a threaded pin, a latching mechanism or the like. Accordingly, the holding element advantageously has a central fastening element for connecting to an external fastening element.

The movable, preferably elastic fixing arms are advantageously fastened with their one end to the holding element, whereas the other end is configured as a free end. The connecting point of the fixing arm can thus act like an elastic hinge.

In one particularly preferred embodiment of the invention, at least one actuating arm is provided on the actuating element, which actuating arm, when the actuating element is plugged into the corresponding cavity or opening in the holding element, is guided with a control face along the fixing arm in such a way that the fixing arm is moved or elastically deflected in a direction away from the actuating arm toward the composite component. The actuating element locks the fixing arm in its completely pushed-in position, with the result that said fixing arm is prevented from returning into its original mounting position (starting position).

It is preferred if the actuating arm or arms have in each case one wedge-shaped form. By means of a structural configuration as described above, the fixing arm can be transferred continuously into its fixing position during the plug-in operation.

Furthermore, it is provided in one embodiment according to the invention of the fastening device that, in the snapped-together state of the actuating element to the holding element, the fastening arm or arms bear with their side face which points toward the center (Z) against the central fastening element and with the side face which points away from the center (Z) against the respectively correspondingly arranged fixing arm. A particularly effective firm fit in the composite component is achieved by way of this mutual contact of the functional components which are provided for fixing the holding element.

In one particularly advantageous embodiment of the invention, the fastening device is produced from plastic. As an alternative, the actuating element might also be configured from metal, for example as a high pressure die cast part, or from a combination of metal and plastic.

It is advantageous, furthermore, if respectively correspondingly arranged latching elements are provided on the holding element and on the actuating element, in order to latch the actuating element to the holding element in its position, in which it is plugged into the holding element.

A further aspect of the present invention relates to a method for producing an integrated fastening structure on or in a sandwich component with a fastening device as described above, having at least the following acts:

introducing a holding element of the above-described fastening device into an opening which is provided to this end in the sandwich component or introducing it directly into the sandwich component; and actuating of the holding element by way of the actuating element, with the result that the fixing arms or arm of the holding element are/is actuated from their/its mounting position into their/its fixing position, in such a way that they/it penetrate/penetrates with at least one section which is provided for fixing into the core zone in the sandwich component.

The method can be characterized by the following further acts:

producing an opening which is open on one side, such as a blind bore, in a sandwich component for introducing the holding element;

the introduction of the fastening device can take place using suitable methods, such as compression of the core material optionally in combination with fusing by way of friction or ultrasound, as a result of which a welded connection between a part of the fastening device and the sandwich component is possibly also produced as intended; and introducing adhesive in order to produce an adhesively bonded connection, in particular in order to improve the transmission of force from the fastening device into the sandwich component.

In the case of a suitable geometric condition for preventing a rotational movement between the sandwich component and the fastening device on one side and the holding element with the actuating element on the other side, it can be ensured even before the fixing position is achieved that the pre-mounted fastening element by way of tightening of a screw, for example using a cordless screwdriver, the "plugging in" and "fixing" is possible in one step by way of the translational movement between the holding element and the actuating element.

Furthermore, it is possible to achieve the clamping action in the end position by way of an annular material cutout, as a result of which a simple and robust embodiment is achieved.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 3 is a diagrammatic sectional view through a carbon fiber reinforced plastic sandwich component according to FIG. 1, into which the holding element of the fastening device is inserted.

FIG. 4 is a diagrammatic sectional view according to FIG. 3, the actuating element being plugged into the holding element of the fastening device.

DETAILED DESCRIPTION OF THE DRAWINGS

Figure 1:
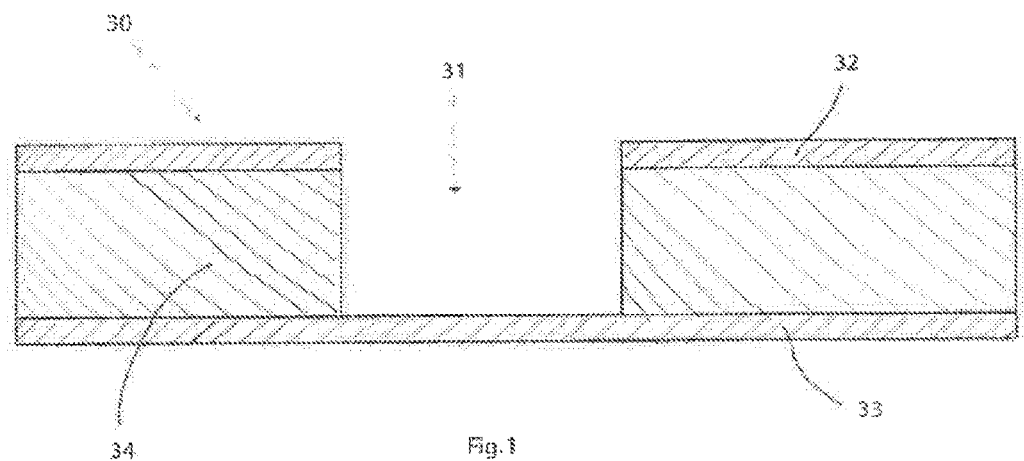
FIG. 1 is a diagrammatic sectional view through a carbon fiber reinforced plastic sandwich component.

FIG. 1 shows a diagrammatic sectional view through a carbon fiber reinforced plastic sandwich component 30. The sandwich component 30, shown here as a panel, consists of an upper carbon fiber reinforced plastic layer 32 and a lower carbon fiber reinforced plastic layer 33. An opening 31 is made in the carbon fiber reinforced plastic sandwich component 30, to be precise the opening is formed as a blind bore, with the result that the lower carbon fiber reinforced plastic layers 33 is not severed in said region. A core zone 34 is situated between the upper and lower carbon fiber reinforced plastic layers 32, 33. In the present exemplary embodiment, the core zone 34 is configured as a zone which is filled with foam. Furthermore, the blind bore 31 does not necessarily have to reach as far as the lower layer 33, as shown, and can also end with its bottom section in another plane.

Figures 2A, 2B, 2C:
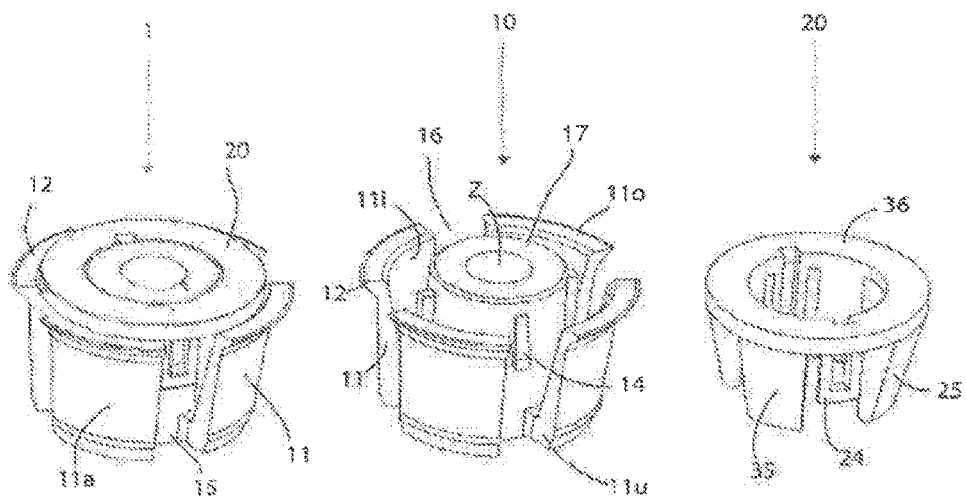
FIGS. 2A-2C are diagrammatic perspective views of one embodiment of a two-piece fastening device, in the snapped-together position and in the separate position.
Figure 5:
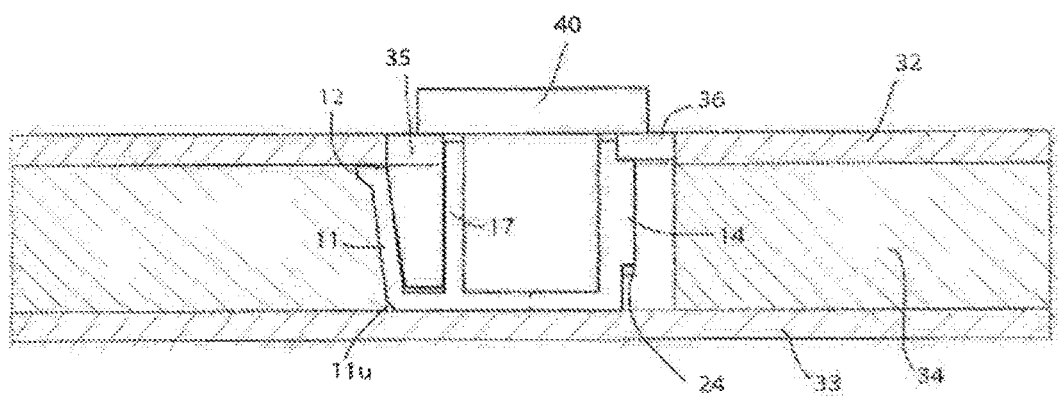
FIG. 5 is a view similar to FIG. 4 in a finally mounted state.

FIGS. 2A-2C are diagrammatic perspective views of one embodiment of a two-piece fastening device 1, in the snapped-together position (FIG. 2A) and in the separate position (FIGS. 2B and 2C). The two-piece fastening device 1 is configured as a snap-together fastening device 1 for plug-in mounting into the opening 31 of the carbon fiber reinforced plastic sandwich component 30. The fastening device 1 includes a holding element 10 and an actuating element 20 produced from a plastic material. The holding element 10 is configured with four fixing arms 11 which can be actuated from a mounting position into a fixing position and are integrally formed on a lower base plate 15.

A central fastening element 17 for connecting to an external fastening element 40, as shown in FIG. 4, is situated at the center Z of the holding element 10. The movable fixing arms 11 are fastened with their one (lower) end $11u$ to the holding element 10, whereas the other (upper) end $11o$ is configured as a free end. In this way, the fixing arm is configured like a spring arm which can be deflected elastically. Accordingly, the upper free end $11o$ can be actuated away from the center toward the outside. The four fixing arms 11 are arranged on the holding element 10 in a radially circumferential manner, in each case two adjacent fixing arms 11 being separated from one another by way of a gap 16.

It can be seen in FIGS. 2A-2C, furthermore, that, on their side $11a$ which is directed from the center Z substantially toward the outside, the four fixing arms 11 have engagement elements 12 for penetrating into the foam zone 34. In the present exemplary embodiment, projections are integrally formed to this end at the free end of the elastic fixing arms 11. As will be explained later more precisely in FIG. 4, these projections serve for mechanical penetration into the foam zone 34 of the sandwich element 30 as soon as the fixing arms 11 are actuated by the actuating element 20 into their fixing position.

As can be seen in the isometric views of FIGS. 2A-2C, furthermore, respectively correspondingly arranged latching elements 14, 24 are provided on the holding element 10 and on the actuating element 20, in order to latch the actuating element 20 to the holding element 10 in its position, in which it is plugged into said holding element 10, as shown in FIG. 4. This ensures that the actuating element 20 does not detach unintentionally from its clamping position, as a result of which the firm fit of the holding element 10 would no longer be reliably ensured. Four actuating arms 35 are provided on the actuating element 20, which actuating arms 35, when the actuating element 20 is plugged into the holding element 10, are guided with a control face 25 along the fixing arm 11 in such a way that the respectively associated fixing arm 11 is moved in a direction away from the actuating arm 35.

The actuating arms 35 have a wedge-shaped form, which forms extend away in the plug-in direction of an annular element 36. In the present case, the actuating arms 35 and the fixing arms 11 are arranged at a uniform angular offset of 90.degree., as is likewise shown in FIG. 4.

FIG. 3 shows a diagrammatic sectional view through a carbon fiber reinforced plastic sandwich component according to FIG. 1, into which sandwich component first of all only the holding element 10 of the fastening device 1 is inserted into the opening 31. The holding element 10 is supported with its base plate 15 on the upper side of the lower carbon fiber reinforced plastic layer 33. The sectional view of FIGS. 3 and 4 follows along in FIG. 2B. It can be seen that the elastic fixing arms 11 bear adjacently with respect to their lower end 11u against the inner side of the opening 31. In its mounting position which is shown in FIG. 3, the fixing arm 11 runs in a somewhat inclined manner toward the center, preferably at an angle of 10-30 degrees with respect to the vertical center axis M through the center Z. The engagement element 12 which is integrally formed at the upper end 11o of the fixing arm 11 protrudes with its end side as far as the inner side wall of the opening 31 in the foam zone 34. The further fixing arms (not shown in the sectional view) are oriented in the same way and are arranged so as to bear against the inner side wall. Therefore, in each case two fixing arms lie diametrically opposite one another.

The central fastening element 17 is configured with an internal thread 19 for screwing in an external fastener 40.

FIG. 4 shows a diagrammatic sectional view according to FIG. 3, the actuating element 20 being plugged into the holding element 10 of the fastening device 1. The actuating element 20 which is shaped correspondingly with respect to the opening 18 is plugged into said opening in the holding element 10, the actuating element 20 having deflected in each case one associated fixing arm 11 into its fixing position by way of its four actuating arms 35.

As can be seen in FIG. 4, furthermore, in the snapped-together state of the actuating element 20 to the holding element 10, the fastening arms 35 bear with their side face 35i which points toward the center Z against the central fastening element 17 and with the side face 35a which points away from the center Z against the respectively correspondingly arranged fixing arm 11.

FIGS. 1, 3 and 4 show the essential steps of the method according to the invention for producing an integrated fastening structure in a sandwich component 30 using a fastening device 1 which is shown in FIGS. 2A-2C, as follows.

First of all, the production of an opening 31 which is open on one side takes place in a sandwich component 30. Afterward, the holding element 10 of the fastening device 1 is mounted into the opening 31. Subsequently, the actuating element 20 is plugged into the holding element 10, with the result that the fixing arms 11 are actuated from their mounting position into their fixing position in such a way that they penetrate mechanically into the sandwich component 30 with their section which is provided for fixing (engagement elements 12). Here, in the case of a sufficiently high pressure, part of the arm can also dip into the foam and can lead locally to compression of the foam.

The implementation of the invention is not restricted to the preferred embodiment of the invention which is specified above. Rather, a number of variants are conceivable which make use of the solution which is shown, even in the case of an embodiment of a fundamentally different type.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A snap-together fastening device for plug-in mounting into an opening, the fastening device comprising:
    a holding element having one or more fixing arms actuatable from a mounting position into a fixing position and a central fastening element configured to connect to an external fastening element; and
    an actuating element that is pluggable into an opening surrounding the central fastening element, the actuating element having a top end including an annular element and a bottom end, wherein
        the actuating element deflects, in its position in which it is plugged into the holding element, at least one fixing arm into a fixing position, and
        in its position in which it is plugged into the holding element, a radially outermost edge of the actuating element, that is in the region of the top end below the annular element, directly contacts a radially inner surface of the at least one fixing arm.

2. The fastening device according to claim 1, wherein the one or more fixing arms arranged in a radially circumferential manner about the holding element.

3. The fastening device according to claim 2, wherein
    on a side directed from a center substantially toward an outside, the one or more fixing arms have engagement elements configured to mechanically penetrate into the core layer when the one or more fixing arms are actuated by the actuating element into the fixing position.

4. The fastening device according to claim 3, wherein:
    the one or more fixing arms are fastened at one end to the holding element and are configured at an other end as a free end.

5. The fastening device according to claim 1, wherein:
    the one or more fixing arms are fastened at one end to the holding element and are configured at an other end as a free end.

6. The fastening device according to claim 1, wherein:
    at least one actuating arm is provided on the actuating element; and
    the actuating arm, when the actuating element is plugged into the holding element, is guided with a control face along a respective fixing arm such that the fixing arm is moved in a direction away from the actuating arm.

7. The fastening device according to claim 6, wherein the at least one actuating arm has a wedge-shaped form.

8. The fastening device according to claim 6, wherein
    in a snapped-together state of the actuating element to the holding element, the one or more actuating arms bear with a side face pointing toward a center against the central fastening element and with a side face pointing away from a center against a respective fixing arm of the holding element.

9. The fastening device according to claim 1, wherein the fastening device is made of plastic at least in a region of the one or more fixing arms actuatable from the mounting position into the fixing position.

10. The fastening device according to claim 1, further comprising:

correspondingly arranged latching elements provided on the holding element and on the actuating element, wherein the actuating element is latched to the holding element in the position in which the actuating element is plugged into the holding element.

11. A method of producing an integrated fastening structure on or in a sandwich component having a core layer, the method comprising the acts of:

introducing a holding element of a fastening device into an opening provided in the sandwich component or introducing the holding element directly into the sandwich component, wherein the holding element comprises one or more fixing arms actuatable from a mounting position into a fixing position, and a central fastening element configured to connect to an external fastening element; and actuating the holding element via an actuating element pluggable into an opening surrounding the central fastening element, the actuating element having a top end including an annular element and a bottom end and deflecting the one or more fixing arms into the fixing position when plugged into the holding element, whereby the one or more fixing arms penetrate with at least one section provided for fixing into the core layer of the sandwich component, wherein in its position in which it is plugged into the holding element a radially outermost edge of the actuating element, that is in the region of the top end below the annular member, directly contacts a radially inner surface of the at least one fixing arm.

12. The method according to claim 11, further comprising the act of connecting the actuating element additionally to the sandwich component via adhesive bonding or welding.

13. The fastening devices according to claim 1, wherein the one or more fixing arms are separated from one another by a void, the void extending from one end of the holding element to another end of the holding element along an axial direction of the holding element.

14. The method according to claim 11, further comprising forming voids that separate the one or more fixing arms, the voids extending from one end of the holding element to another end of the holding element along an axial direction of the holding element.

* * * * *